United States Patent
Wang

(10) Patent No.: US 9,179,286 B2
(45) Date of Patent: Nov. 3, 2015

(54) METHOD, SYSTEM, AND DEVICE FOR REGISTERING WITH LOCAL MOBILITY ANCHORS

(75) Inventor: Yungui Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 165 days.

(21) Appl. No.: 12/873,410

(22) Filed: Sep. 1, 2010

(65) Prior Publication Data

US 2010/0332627 A1    Dec. 30, 2010

Related U.S. Application Data

(63) Continuation of application No. PCT/CN2009/070508, filed on Feb. 23, 2009.

(30) Foreign Application Priority Data

Mar. 13, 2008 (CN) .......................... 2008 1 0084622

(51) Int. Cl.
*H04W 8/06* (2009.01)
*H04W 8/12* (2009.01)
*H04W 80/04* (2009.01)
*H04W 88/18* (2009.01)

(52) U.S. Cl.
CPC . *H04W 8/06* (2013.01); *H04W 8/12* (2013.01); *H04W 80/04* (2013.01); *H04W 88/182* (2013.01)

(58) Field of Classification Search
None
See application file for complete search history.

(56) References Cited

U.S. PATENT DOCUMENTS

| | | | | |
|---|---|---|---|---|
| 8,238,930 | B2 * | 8/2012 | Awano | 455/453 |
| 8,566,455 | B1 * | 10/2013 | Zhao et al. | 709/227 |
| 2002/0085518 | A1 | 7/2002 | Lim | |
| 2004/0063402 | A1 | 4/2004 | Takeda et al. | |
| 2004/0090942 | A1 | 5/2004 | Flinck | |
| 2004/0141477 | A1 * | 7/2004 | Xu et al. | 370/328 |
| 2004/0202126 | A1 | 10/2004 | Leung et al. | |
| 2009/0073935 | A1 * | 3/2009 | Xia et al. | 370/331 |
| 2010/0296481 | A1 * | 11/2010 | Weniger et al. | 370/331 |
| 2013/0170356 | A1 * | 7/2013 | Awano | 370/236 |

FOREIGN PATENT DOCUMENTS

| | | |
|---|---|---|
| CN | 1486094 | 3/2004 |
| CN | 1653772 | 8/2005 |
| WO | 03/096650 | 11/2003 |

OTHER PUBLICATIONS

S. Krishnan, Redirecting Proxy Binding Updates in PMIPv6, Feb. 25, 2006, Internet-Draft, p. 6—section 5 and 6.*
Gundavelli, S. et al., *Proxy Mobile IPv6*, Nokia Siemens Networks, Dec. 25, 2007, pp. 1-66.

(Continued)

*Primary Examiner* — Greg C Bengzon
(74) *Attorney, Agent, or Firm* — Staas & Halsey LLP

(57) ABSTRACT

A method, system and device for registering with a Local Mobility Anchor (LMA) are disclosed. The method includes: receiving a message from at least one local device; selecting a new local device according to the message; and registering with the new local device. The present invention enables dynamic registration with the LMA based on the network. In the Proxy Mobile Internet Protocol (PMIP) domain, network sharing and load balancing are properly supported, the network is more reliable, and it is convenient for the operator to deploy the network massively.

3 Claims, 8 Drawing Sheets

(56) References Cited

OTHER PUBLICATIONS

Johnson, D. et al., *Mobility Support in IPv6*, Ericsson, Jun. 2004, pp. 1-26.
Kulkarni, M. et al., *Mobile IPv4 Dynamic Home Agent (HA) Assignment*, Cisco Systems Inc., Mar. 2006, pp. 1-23.
*The Research of Mobile IPv4 Dynamic HA* (Translation only).
*Proxy Mobile IPv6 Support in WiMAX, Part of Network Working Group Release 1.5*, WiMAX Forum, Aug. 2007, pp. 1-20.
Written Opinion of the International Searching Authority, mailed Jun. 4, 2009, in corresponding International Application No. PCT/CN2009/070508 (4 pp.).
Office Action, mailed Jan. 26, 2011, in corresponding Chinese Application No. 200710119496.4 (8 pp.).
Krishnan, S. et al., *Redirecting Proxy Binding Updates in PMIPv6*, Network Working Group, Feb. 25, 2008, pp. 1-9.
Kulkarni, M. et al., *Mobile IPv4 Dynamic Home Agent (HA) Assignment*, Network Working Group, Mar. 2006, pp. 1-25.
Extended European Search Report, mailed May 23, 2011, in European Application No. 09719596.0.
Office Action issued Oct. 9, 2012 in corresponding European Patent Application No. 09 719 596.0-2413 (4 pages).
European Office Action issued May 4, 2012 in corresponding European Patent Application No. 09 719 596.0-2413 (4 pages).

* cited by examiner

| Type | L | Reserved |
|---|---|---|
| Sequence number or timestamp | | |
| Heartbeat interval | | |
| Load-related information | | |

FIG. 6

METHOD, SYSTEM, AND DEVICE FOR REGISTERING WITH LOCAL MOBILITY ANCHORS

CROSS-REFERENCE TO RELATED APPLICATIONS

This application is a continuation of International Application No. PCT/CN2009/070508, filed on Feb. 23, 2009, which claims priority to Chinese Patent Application No. 200810084622.1, filed on Mar. 13, 2008, both of which are hereby incorporated by reference in their entireties.

FIELD OF THE INVENTION

The present invention relates to communications technologies, and in particular, to a method, system, and device for registering with Local Mobility Anchors (LMAs).

BACKGROUND OF THE INVENTION

In the prior art, a Mobile Node (MN) on the home network uses a Home Address (HoA) to communicate with a Correspondent Node (CN). When the MN moves to a visited network, the MN obtains an address, namely, a Care-of Address (CoA), from the visited network. The MN sends a binding update message that carries the CoA to a Home Agent (HA). Binding entries between the HoA and the CoA of the MN are created on the HA, and a bidirectional tunnel between the HA and the MN is set up. After receiving the registration request, the HA encapsulates the Internet Protocol (IP) packet that needs to be forwarded to the MN. The source address of the outer packet is the address of the HA, and the destination address of the outer packet is the CoA. The HA forwards the encapsulated packet to the MN through a tunnel. When sending a packet, the MN uses the CoA. The source address of the outer packet is the CoA, and the destination address of the outer packet is the address of the HA. The source address of the inner packet is the HoA, and the destination address of the inner packet is the address of the CN. The HA decapsulates the received packet, and forwards the inner packet to the CN.

The Proxy Mobile Internet Protocol Version 6 (PMIPv6) protocol is an extension of the Mobile Internet Protocol Version 6 (MIPv6): A Mobile Access Gateway (MAG) simulates the home link, and notifies a Home Network Prefix (HNP, HoA prefix) to the MN so that the MN believes that the MN is always on the home link; in place of the MN, the MAG sends a registration packet to the LMA. The LMA is equivalent to an HA in MIPv6. It creates binding buffer entries between the HNP and the MAG interface address (Proxy-CoA) on the LMA, and sets up a bidirectional tunnel for transmitting the packet of the MN between the MAG and the LMA. The process of receiving and sending the packet is as follows:

The peer node sends a packet to the HoA of the MN. The packet is intercepted by the LMA. Afterward, the LMA queries the binding list according to the HNP, and sends the packet to the MAG through the tunnel between the LMA and the MAG. The MAG de-tunnels the packet and sends the packet to the MN according to the destination address of the packet. When the MN sends a packet to the peer node, the MAG encapsulates the received packet, adds an outer packet (including the source address), and then sends the packet to the LMA through the tunnel between the MAG and the LMA. The LMA strips the outer packet, and forwards the inner packet to the peer node.

In the existing Proxy Mobile Internet Protocol (PMIP) domain, when the MN accesses the network, to enable the MN to support the mobility service, the MAG needs to perform Proxy Binding Update (PBU) registration. The registration process is as follows:

1. The MN accesses the network.
2. After the access authentication process is completed, the Authentication, Authorization and Accounting (AAA) server returns a message to the MAG. The message carries MN configuration information, for example, LMA address, Network Access Identifier (NAI) of the MN.
3. In place of the MN, the MAG sends a PBU request to the LMA.
4. The LMA returns a Proxy Binding Acknowledge (PBA) message that carries the HNP of the MN.
5. The MAG sends a Route Advertisement (RA) that carries the HNP of the MN to the MN.

In the process of implementing the present invention, the inventor finds at least the following defects in the prior art:

The registration process is unable to support network sharing or load balancing properly. When the LMA returns a registration failure message due to overload or local management policy adjustment, the MN may regress to the simple Internet Protocol Version 6 (IPv6) service or be rejected to access service, and is unable to support the mobility service of the MN properly.

SUMMARY OF THE INVENTION

The embodiments of the present invention provide a method, system, and device for registering with LMAs to enable dynamic registration in a PMIP system that supports network sharing and load balancing.

A method for registering with LMAs in an embodiment of the present invention includes:
  receiving a message from at least one local device;
  selecting a new local device according to the message; and
  registering with the new local device.

A system for registering with LMAs in an embodiment of the present invention includes:
  a local device, configured to send a message to an agent device, where the message is a registration response message or load-related information, and the registration response message carries a redirection indication; and
  an agent device, configured to receive the message from at least one local device, select a new local device according to the message, and register with the new local device.

An agent device provided in an embodiment of the present invention includes:
  a registration response receiving unit, configured to receive a message from at least one local device, where the message is a registration response message or load-related information, and the registration response message carries a redirection indication;
  a new local device selecting unit, configured to select a new local device according to the message received by the registration response receiving unit; and
  a registering unit, configured to register with the new local device selected by the new local device selecting unit.

A local device provided in an embodiment of the present invention includes:
  a registering unit, configured to perform registration after receiving a registration request from an agent device; and
  a registration failure sending unit, configured to send a registration response message to the agent device, where the registration response message carries a redirection indication.

The embodiments of the present invention enable dynamic registration with an LMA based on the network. Therefore, in the PMIP domain, network sharing and load balancing are properly supported, the network is more reliable, and it is convenient for the operator to deploy the network massively.

BRIEF DESCRIPTION OF THE DRAWINGS

FIG. 6 shows a load option message added to a heartbeat message in an embodiment of the present invention;

DETAILED DESCRIPTION OF THE EMBODIMENTS

Figure 1A:
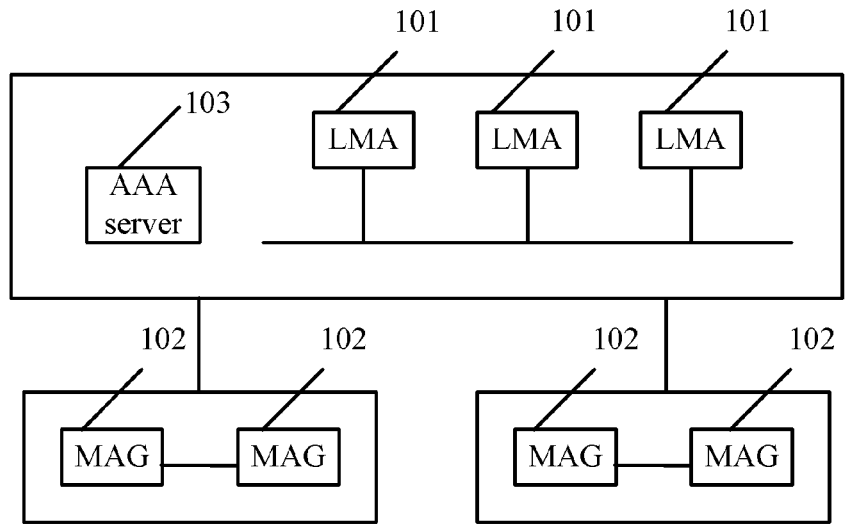
FIG. 1a shows a structure of a PMIP system in an embodiment of the present invention.
Figure 1B:
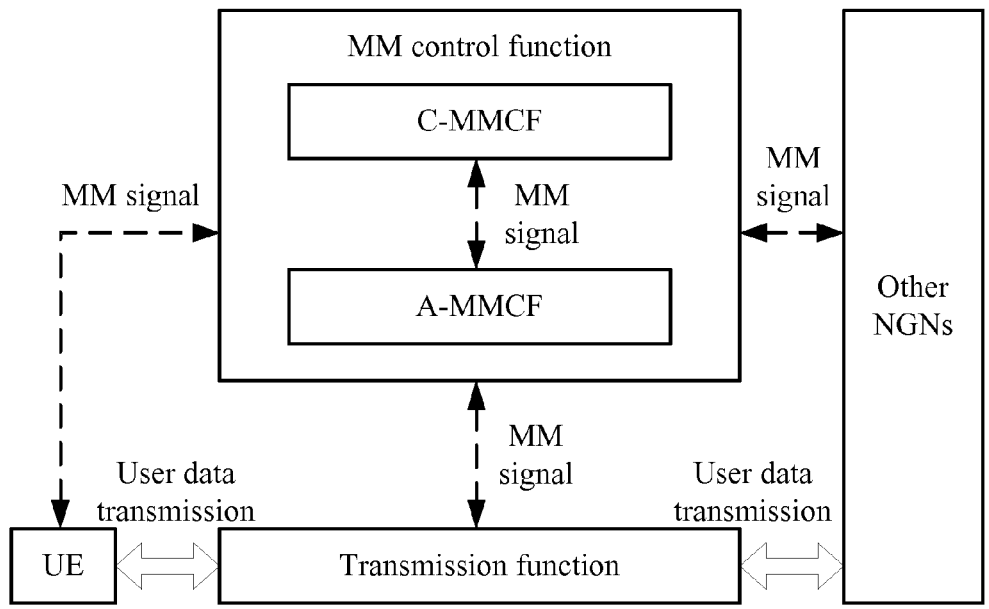
FIG. 1b shows a reference structure of a Next Generation Network (NGN) in an embodiment of the present invention.

As shown in FIG. 1a, a PMIP system in an embodiment of the present invention includes more than one LMA 101. Network sharing and load balancing are supported between the LMAs 101; many-to-many connections exist between a MAG 102 and an LMA 101; and the AAA server 103 performs authentication and authorization for the MN in the access process, and stores or obtains the MN configuration information. The PMIP system shown in FIG. 1a is a logical framework system. The system is applicable to the network architecture in the Worldwide Interoperability for Microwave Access (WiMAX) standard, 3rd Generation Partnership Project (3GPP) standard, and 3GPP2 standard. For example, when the system is applied to the WiMAX standard, the MAG may be located on an access gateway of the access service network of the WiMAX system; and the LMA is located on the connection service network of the WiMAX system, and may coexist with the HA that supports the PMIP function. In the PMIP system, mobility management may be only a control function, and is separated from data routing. For example, as shown in FIG. 1b, a reference architecture of an NGN includes: a Central Mobility Management Control Function (C-MMCF), located on an NGN core network; and an Access Mobility Management Control Function (A-MMCF), located on an NGN access network. The LMA above refers to a C-MMCF, and the MAG above refers to an A-MMCF. Further, the MMCF may be categorized into a Location Management Function (LMF) and a Handover Control Function (HCF). Accordingly, the LMA above refers to a Central Location Management Function (C-LMF), and the MAG above refers to an Access Location Management Function (A-LMF); and/or the LMA above refers to a Central Handover Control Function (C-HCF), and the MAG above refers to an Access Handover Control Function (A-HCF).

Based on the foregoing system, the following embodiments describe how the MAG selects the LMA, performs PBU registration, sends a registration result (HNP of the MN) to the MN, and performs an access registration process of the MN.

Figure 2A:
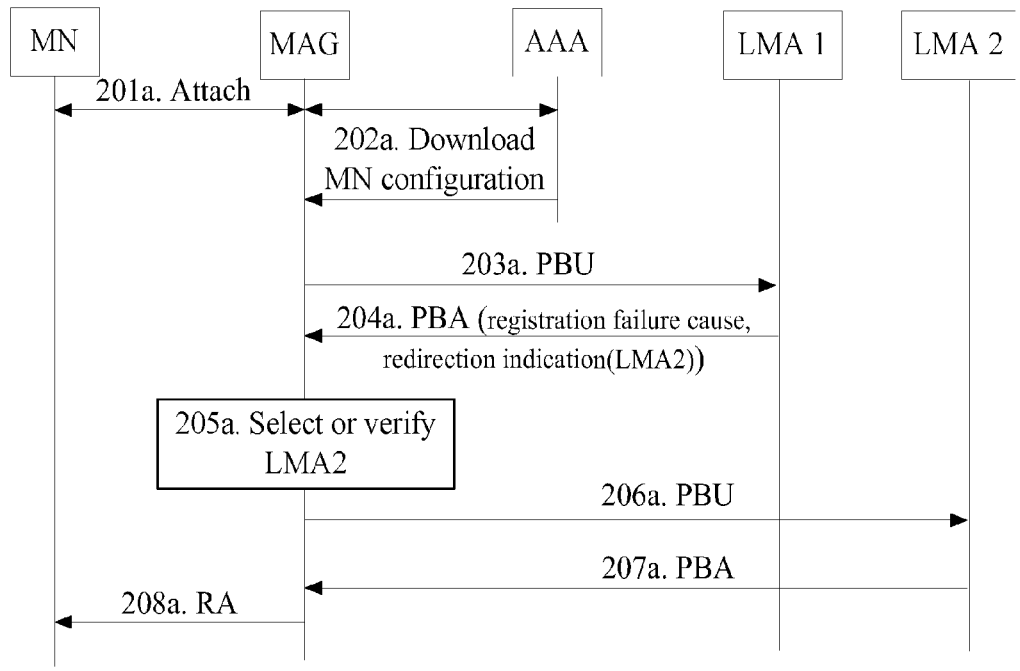
FIG. 2a is a flowchart of a method for registering with an LMA in a first embodiment of the present invention.

The first embodiment of the present invention provides a method for registering with an LMA. When a failure message is returned because the LMA is overloaded or the local management policy is adjusted, redirection can be performed in two modes: When LMA1 returns a failure message carrying a redirection indication and a recommended LMA2 address, the MAG sends a PBU message to LMA2 to perform PBU registration; or, when LMA1 returns a failure message carrying a redirection indication and no recommended LMA2 address (to cope with the circumstance that LMA1 makes no response), the MAG sends a PBU message to other LMAs to perform PBU registration according to the LMA address list in the MN configuration. When LMA1 returns a failure message, the failure cause carried in the message is that the MN does not subscribe to the service or does not pass the authentication, the MAG selects no other LMAs. As shown in FIG. 2a, the process includes the following steps:

Step 201a: The MN gets attached to the network, and undergoes access authentication through the MAG.

Step 202a: When the access authentication is completed, the AAA server downloads the MN configuration file to the MAO. The MN configuration file carries one or more LMA addresses, and multiple LMA addresses may be arranged by priority, or arranged randomly.

Step 203a: In place of the MN, the MAG performs registration, and sends a PBU request to LMA1. Optionally, an added option carries other LMA addresses in the MN configuration.

Step 204a: LMA1 sends a PBA message to the MAG. When LMA1 fails in the registration due to overload or local management policy adjustment, the PBA message carries registration failure information. The registration failure information carries a registration failure cause. If the registration failure cause is that the service is not subscribed to, or the authentication fails, no processing is required; if the registration failure cause is overload or local management policy adjustment, the PBA message carries a redirection indication, and optionally, the redirection indication carries an LMA2 address. According to the load, LMA priority and local configuration policy, LMA1 decides to select LMA2 which needs redirection. If the added option in the PBU message received in step 203a carries other LMA address lists (one or more LMA addresses), LMA2 may exist in the list. In another scenario, LMA1 may send a message to query the AAA server, and obtain the address of LMA2 from the AAA server. In this case, the MAG does not need to obtain or add the LMA list of the MN in step 202a or step 203a, and does not need to authenticate LMA2 in the subsequent steps.

Step 205a: After receiving the PBA message which indicates binding update failure, the MAG authenticates or selects LMA2. If the PBA message carries an LMA2 address for redirection, the MAG verifies the LMA2 address. The verification method is: comparing the LMA2 address with the LMA address in the MN configuration file; or interacting with the AAA server, which verifies the LMA2 address. If the PBA message carries no LMA2 address, or if LMA1 makes no response, the MAG selects LMA2 from the MN configuration (selects the LMA by priority, or through polling), or obtains an LMA2 address from the AAA server again.

Step 206a: In place of the MN, the MAG performs registration, and sends a PBU request to LMA2.

Step 207a: LMA2 acknowledges registration success, and sends a PBA message to the MAG. The PBA message carries an HNP allocated to the MN.

Step 208a: The MAG sends an RA that carries the HNP of the MN to the MN.

Figure 2B:
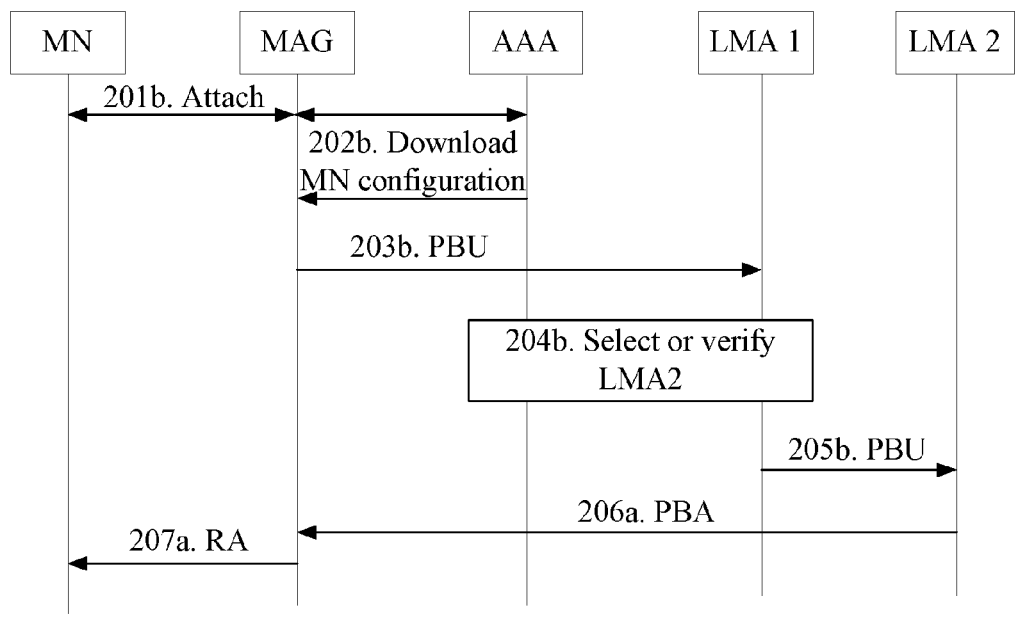
FIG. 2b is a flowchart of another method for registering with an LMA in the first embodiment of the present invention.

The first embodiment of the present invention provides another method for registering with an LMA as an alternative. When LMA1 is unable to serve the MN for the foregoing reasons, if LMA2 is determined, the PBU message may be forwarded to LMA2; and LMA2 returns a PBA message to the MAG directly or through LMA1, thus completing the registration. As shown in FIG. 2b, the process includes the following steps:

Step 201b: The MN gets attached to the network, and undergoes access authentication.

Step 202b: When the access authentication is completed, the AAA server downloads the MN configuration file to the MAG.

Step 203b: In place of the MN, the MAG performs registration, and sends a PBU request to LMA1.

Step 204b: If LMA1 is unable to serve the MN due to overload or local management policy adjustment, LMA1 obtains the LMA2 address according to the local configuration or heartbeat message, and optionally, sends a query message to the AAA server and obtains the LMA2 address from the AAA server.

Step 205b: LMA1 forwards the PBU request to LMA2.

Step 206b: LMA2 returns a PBA message to the MAG to acknowledge registration success. The message carries an HNP allocated to the MN. The PBA message is forwarded through LMA1 or sent to the MAO directly.

Step 207b: The MAG sends an RA that carries the HNP of the MN to the MN.

Figure 3:
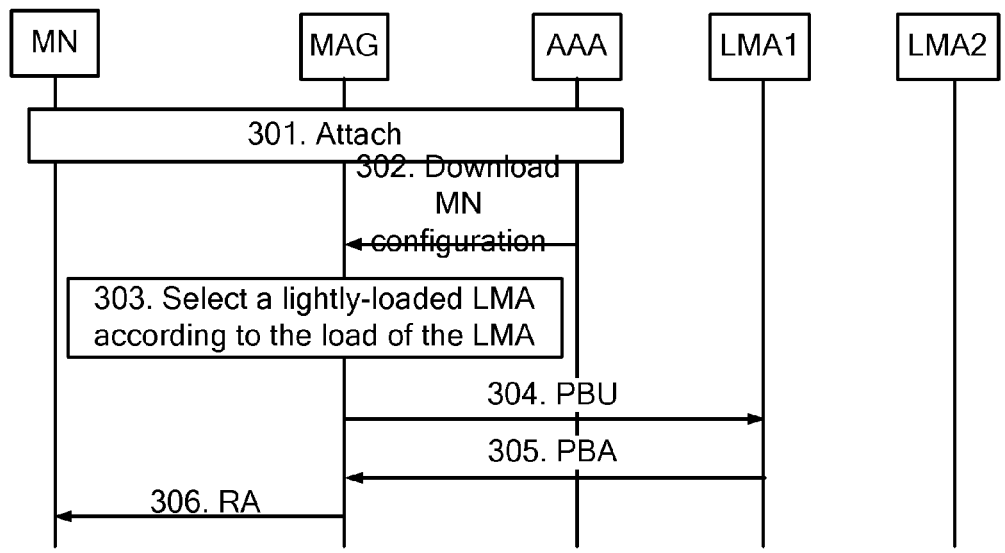
FIG. 3 is a flowchart of a method for registering with an LMA in a second embodiment of the present invention.

The second embodiment of the present invention provides a method for registering with an LMA. After knowing the load of the LMA, the MAG may select an LMA based on load balancing. For PBU registration in place of the MN, the MAG selects the lightly-loaded LMA in the LMA list configured by the MN for the purpose of registration. As shown in FIG. 3, the process includes the following steps:

Step 301: The MN gets attached to the network, and undergoes access authentication through the MAG.

Step 302: When the access authentication is completed, the AAA server downloads the MN configuration file to the MAG. The file carries one or more LMA addresses.

Step 303: According to the load of the LMA, the MAG selects a lightly-loaded LMA.

Step 304: In place of the MN, the MAG performs registration, and sends a PBU request to the LMA.

Step 305: The LMA acknowledges registration success, and sends a PBA message to the MAG. The PBA message carries an HNP allocated to the MN.

Step 306: The MAG sends an RA that carries the HNP of the MN to the MN.

Figure 4:
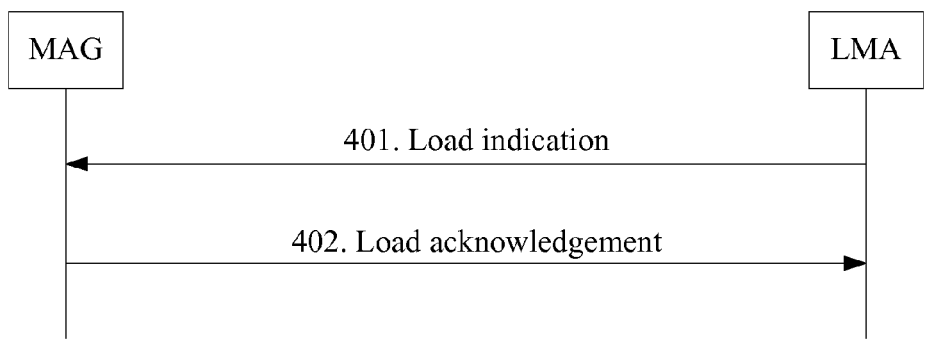
FIG. 4 shows a process of synchronizing load-related information between a MAG and an LMA in an embodiment of the present invention.
Figure 5:
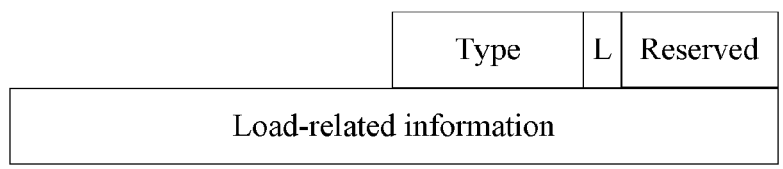
FIG. 5 shows a format of a load indication message in an embodiment of the present invention.

An LMA load list arranged in ascending or descending order may be created on the MAG, and is updated dynamically according to the load-related information synchronized between the MAG and the LMA. As shown in FIG. 4, the process of synchronizing the load-related information between the MAG and the LMA includes the following steps:

Step 401: The LMA sends a load indication message to the MAG. The message carries the information about the current load of the LMA, and the load-related information indicates that the LMA is currently overloaded or recovered from overload; or the message carries a specific load index such as resource occupancy and connection occupancy. As shown in FIG. 5, a load indication message includes: a type field such as request and response; an L flag field, indicating load-related information, where 0 represents normal or recovery from overload, and 1 represents overload; a reserved field; a load-related information field, which is optional, and is usable when the LMA sends a specific load index to the MAG.

Step 402: The MAG returns an acknowledgement message to the LMA, and updates the local LMA priority list dynamically according to the LMA load-related information.

In the process described above, the LMA sends load-related information to the MAG actively; in the information synchronization, the MAG may also request the load-related information from the LMA actively. The load-related information synchronization process is independent of the lower-layer transmission. The transmission between the LMA and the MAG may be point-to-point link transmission, or the LMA performs multicast, broadcast, or anycast to multiple MAGs. The load indication or load indication message may be an independent message, or is carried as an option of another message to the MAG. For example, a load option message is added to the heartbeat message, as shown in FIG. 6, where an L flag bit is added, 0 represents normal or recovery from overload, and 1 represents overload. Optionally, the detailed load-related information is carried in a load-related information field.

Figure 7:
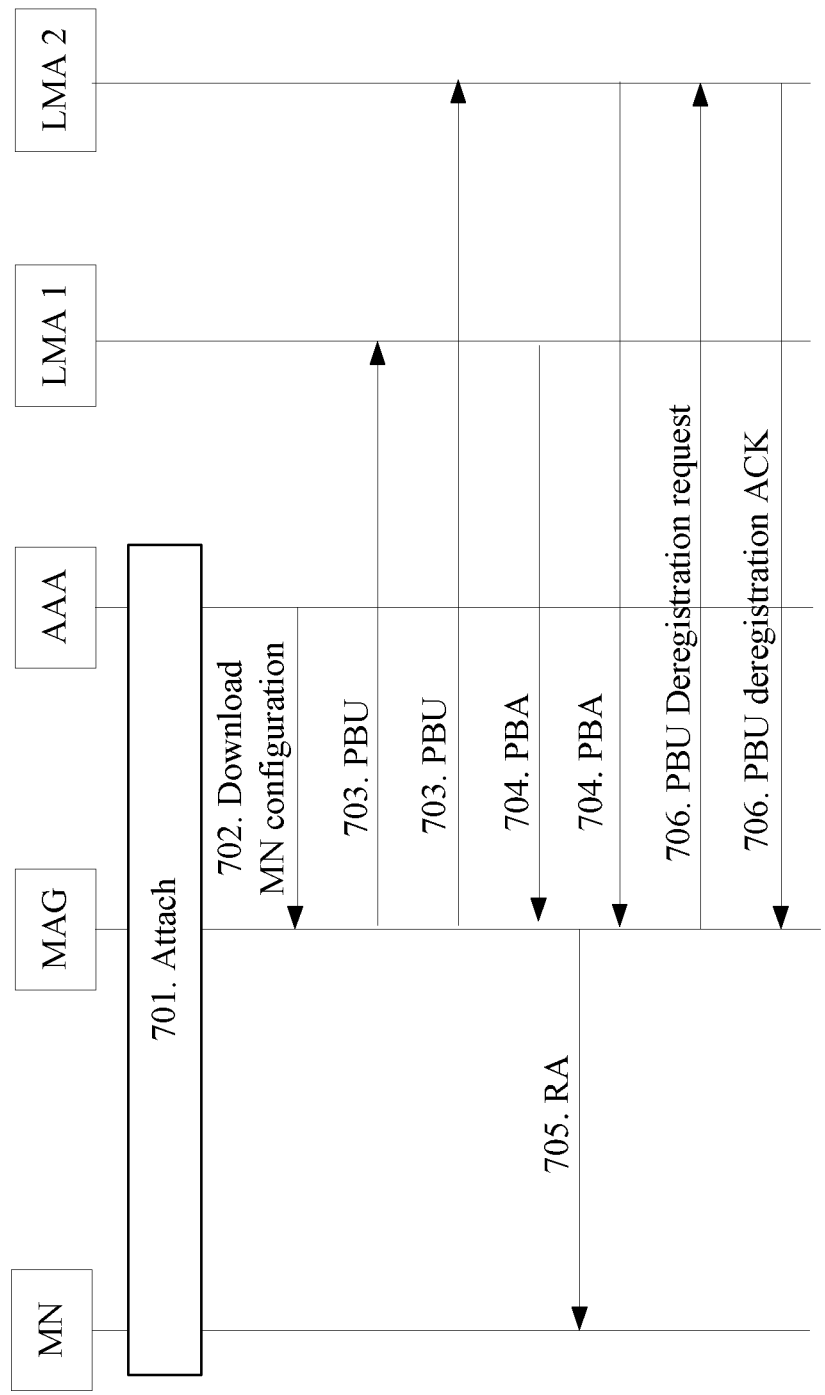
FIG. 7 is a flowchart of a method for registering with an LMA in a third embodiment of the present invention.

The third embodiment of the present invention provides a method for registering with an LMA. To shorten the MN access delay, the MAG selects one or more LMAs from the MN configuration, and sends a PBU message to all LMAs simultaneously. The MAG selects the LMA which responds first, and sends the HNP allocated to this LMA to the MN. As shown in FIG. 7, the process includes the following steps:

Step 701: The MN gets attached to the network, and undergoes access authentication through the MAG.

Step 702: When the access authentication is completed, the AAA server downloads the MN configuration file to the MAG. The file carries one or more LMA addresses.

Step 703: The MAG sends a PBU request to one or more LMAs in the MN configuration simultaneously.

Step 704: The LMA(s) acknowledges registration success, and sends a PBA message to the MAG. The PBA message carries an HNP allocated to the MN.

Step 705: The MAG selects the LMA which first acknowledges the registration success, and sends an RA that carries the HNP of the MN to the MN.

Step 706: The MAG initiates a PBU deregistration process to other LMAs.

Figure 8:
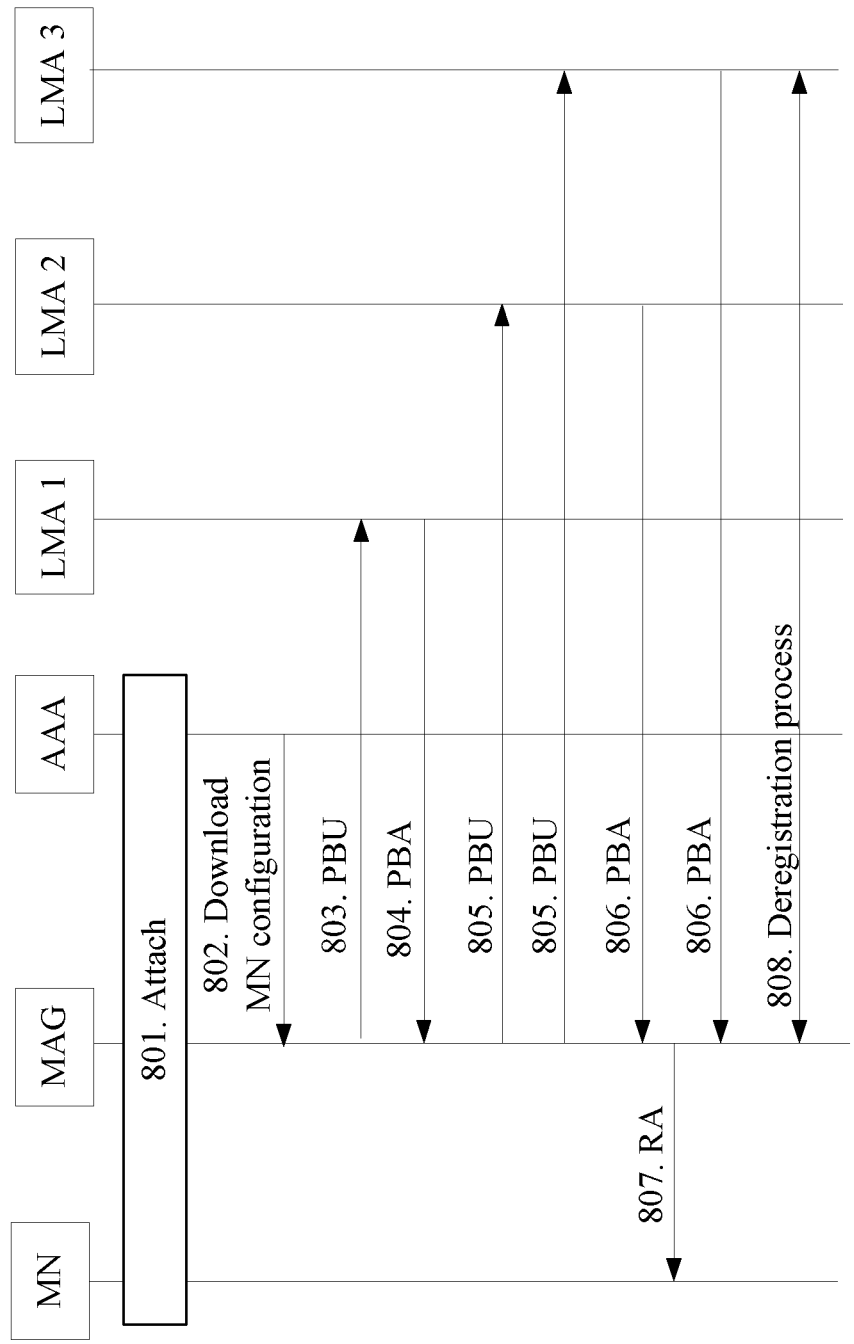
FIG. 8 is a flowchart of a method for registering with an LMA in a fourth embodiment of the present invention.

The fourth embodiment of the present invention provides a method for registering with an LMA. To shorten the MN access delay and reduce the network signaling overhead, the MAG sends a PBU message to other LMAs after receiving a PBA registration failure message from the current LMA, selects the LMA which responds first, and sends the HNP allocated to this LMA to the MN. As shown in FIG. 8, the process includes the following steps:

Step 801: The MN gets attached to the network, and undergoes access authentication through the MAG.

Step 802: When the access authentication is completed, the AAA server downloads the MN configuration file to the MAG. The file carries one or more LMA addresses.

Step 803: The MAG initiates PBU registration to LMA1.

Step 804: Due to resource deficiency or local configuration policy adjustment, LMA1 returns a PBA failure message.

Step 805: The MAG sends a PBU request to one or more LMAs in the MN configuration simultaneously except LMA1.

Step 806: The LMA(s) acknowledges registration success, and sends a PBA message to the MAG. The PBA message carries an HNP allocated to the MN.

Step 807: The MAG selects the LMA which first acknowledges the registration success, and sends an RA that carries the HNP of the MN to the MN.

Step 808: The MAG initiates a PBU deregistration process to other LMAs.

Figure 9:
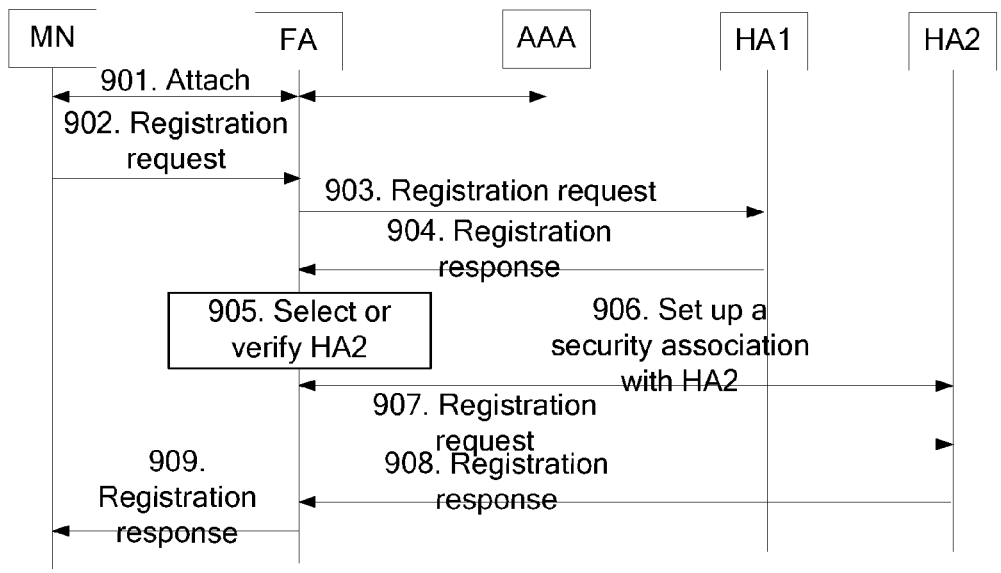
FIG. 9 is an MN registration flowchart of an ordinary Mobile Internet Protocol (MIP) domain in the fourth embodiment of the present invention.

In the foregoing embodiment, the LMA is selected based on network redirection. In another embodiment of the present invention, the technical solution is applied to MN registration in an ordinary MIP domain. In this embodiment, FA represents Foreign Agent, which is equivalent to a MAG; and HA represents Home Agent. The LMA registration method is similar to the method in the first to fourth embodiments. Taking one of the scenarios as an example, as shown in FIG. 9, the detailed process includes the following steps:

Step 901: The MN gets attached to the network, and undergoes access authentication through the FA.

Step 902: The MN sends a registration request. Optionally, the registration request is extended with an added option that carries the candidate HA addresses.

Step 903: The FA sends a registration request to HA1. Optionally, the registration request is extended with an added option that carries the candidate HA addresses.

Step 904: HA1 sends a registration response to the FA. If HA1 fails in the registration due to overload or local management policy adjustment, the response carries the registration failure information. Optionally, the registration response carries a redirection indication and/or an HA2 address.

Step 905: After receiving a registration response failure message, the FA authenticates or selects HA2: If the registration response message carries an HA2 address for redirection, the FA verifies the HA2 address. For example, the FA interacts with the AAA server and the AAA server verifies the HA2 address. If the registration response message carries no HA2 address, or if HA1 makes no response, the FA selects HA2 from the MN configuration, or obtains an HA2 address from the AAA server again.

Step 906: Optionally, the FA sets up a security association with HA2 after selecting or verifying the HA2 address to protect the subsequent registration message.

Step 907: The FA sends a registration request to HA2.

Step 908: The HA2 acknowledges registration success, and sends a registration response to the FA.

Step 909: The FA sends a registration response message that carries a registration result to the MN.

Figure 10:
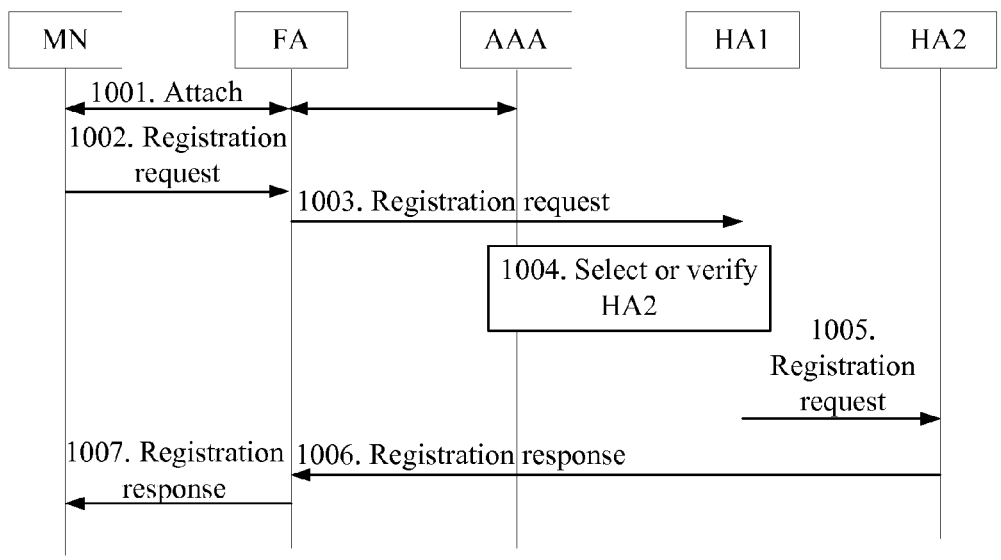
FIG. 10 is an MN registration flowchart of another ordinary MIP domain in the fourth embodiment of the present invention.

In another embodiment of the present invention, the foregoing HA1 can perform redirection directly and select HA2, and forward a PBU registration message. As shown in FIG. 10, the process includes the following steps:

Step 1001: The MN gets attached to the network, and undergoes access authentication.

Step 1002: The MN sends a registration request. Optionally, the registration request is extended with an added option that carries the candidate HA addresses.

Step 1003: The FA sends a registration request to HA1. Optionally, the registration request is extended with an added option that carries the candidate HA addresses.

Step 1004: If HA1 fails in the registration due to overload or local management policy adjustment, HA1 obtains the HA2 address according to the local configuration or heartbeat message. Optionally, HA1 sends a query message to the AAA server (to perform authentication and selection), and obtains the HA2 address from the AAA server.

Step 1005: HA1 forwards the PBU registration request to HA2.

Step 1006: The HA2 acknowledges registration success, and sends a registration response to the FA. The registration response message is forwarded through HA1 or sent to the FA directly.

Step 1007: The FA sends a registration response message that carries a registration result to the MN.

Figure 11:
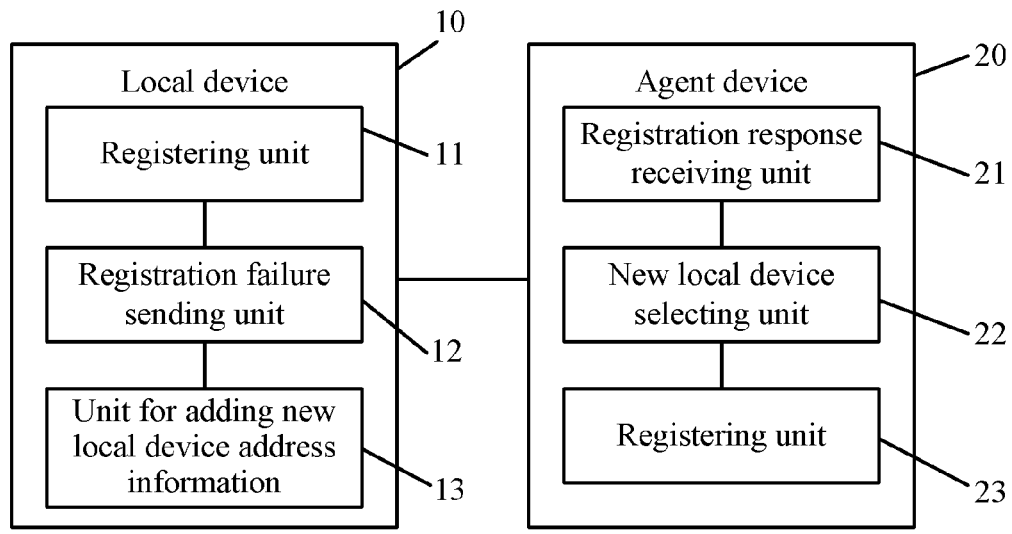
FIG. 11 shows a structure of a system for registering with an LMA in an embodiment of the present invention.

A system for registering with an LMA is provided in an embodiment of the present invention. As shown in FIG. 11, the system includes:

a local device 10, configured to send a registration response message to an agent device, where the registration response message carries a redirection indication; and an agent device 20, configured to receive the message from at least one local device, select a new local device, and register with the new local device.

The agent device 20 includes:

a registration response receiving unit 21, configured to receive a registration response message from at least one local device, where the registration response message carries a redirection indication;

a new local device selecting unit 22, configured to select a new local device; and a registering unit 23, configured to register with the new local device.

The new local device selecting unit 22 includes:

a first selecting subunit, configured to select the address of the new local device from a local address list; or a second selecting subunit, configured to obtain the address of the new local device from the registration response message sent by the local device; or a third selecting subunit, configured to send a registration request to at least two local devices, receive the registration success acknowledgement sent by the local device, and select the local device which first acknowledges the registration success as the new local device.

The local device 10 includes:

a registering unit 11, configured to perform registration after receiving a registration request from an agent device; and a registration failure sending unit 12, configured to send a registration response message to the agent device, where the registration response message carries a redirection indication; and a unit 13 for adding new local device address information, configured to select the address of the new local device from a local address list, or obtain the address of the new local device from the message sent by the agent device, or obtain the address of the new local device from the AAA server, and send the address through the registration response message.

Figure 12:
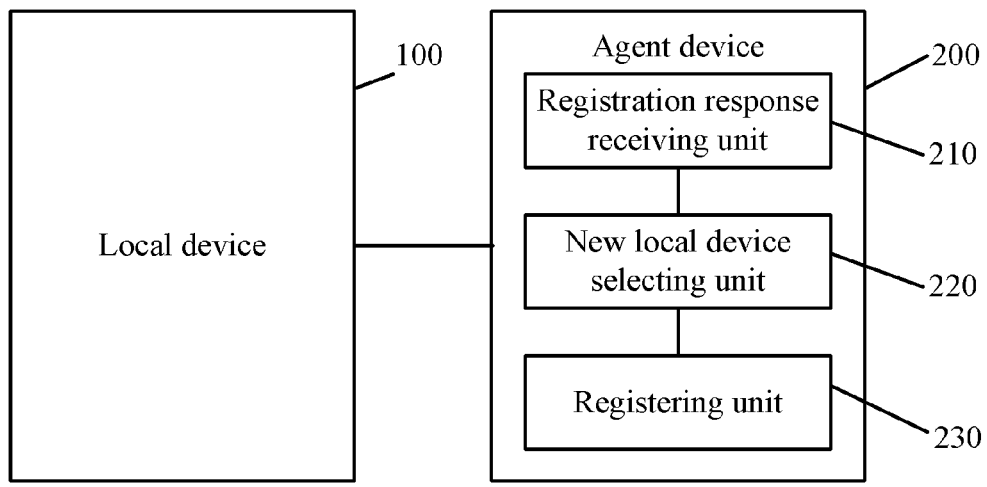
FIG. 12 shows a structure of another system for registering with an LMA in an embodiment of the present invention.

Another system for registering with an LMA is provided in an embodiment of the present invention. As shown in FIG. 12, the system includes:

a local device 100, configured to send load-related information to an agent device; and an agent device 200, configured to receive the information about the load of at least one local device, select a new local device according to the received load-related information, and register with the new local device.

The agent device 200 includes:

a registration response receiving unit 210, configured to receive information about the load of at least one local device;

a new local device selecting unit 220, configured to select a new local device according to the received load-related information; and a registering unit 230, configured to register with the new local device.

The agent device 200 may further include: a load requesting unit, configured to send a load-related information request to the local device.

The new local device selecting unit 220 is further configured to receive a registration success acknowledgement sent by the local device, and select the local device which first acknowledges the registration success as the new local device.

The embodiments of the present invention enable dynamic registration with the LMA based on the network. In the PMIP domain, network sharing and load balancing are properly supported, the network is more reliable, and it is convenient for the operator to deploy the network massively.

After reading the foregoing embodiments, those skilled in the art are clearly aware that the embodiments of the present invention may be implemented through hardware, or through software in addition to a necessary universal hardware platform, but the latter is preferred in most circumstances. Therefore, the technical solution under the present invention or the contributions to the prior art may be embodied as a software product. The software product may be stored in a computer-readable storage medium and incorporate several instructions for instructing a computer device (for example, a personal computer, a server, or a network device) to execute the method specified in each embodiment of the present invention.

The above descriptions are merely exemplary embodiments of the present invention and not intended to limit the scope of the present invention. Any modifications or variations that can be derived by those skilled in the art should fall within the scope of the present invention.

What is claimed is:

1. A method for registering with a Local Mobility Anchor (LMA), comprising:

sending, by a Mobile Access Gateway (MAG) computer device on behalf of a Mobile Node (MN), a first Proxy Binding Update (PBU) message to a first Local Mobility Anchor (LMA) computer device, wherein the first PBU message is a request message for establishing, on the first LMA computer device, a binding between a home network prefix of the MN and a proxy care-of address (Proxy-CoA) of the MAG computer device;

receiving, by the MAG computer device, a Proxy Binding Acknowledge (PBA) message from the first LMA computer device in response to the first PBU message, wherein the PBA message contains registration failure information of the first LMA, the registration failure information of the first LMA includes a registration failure cause, the registration failure cause is resource insufficiency or local management policy adjustment; and the PBA message further contains a redirection indication to indicate the MAG computer device to send a subsequent PBU message to a second LMA computer device, the redirection indication includes an address of the second LMA computer device; and in response to the PBA message with the registration failure information of the first LMA, sending, by the MAG computer device on behalf of the MN, a second PBU message to the second LMA computer device according to the address of the second LMA computer device included in the redirection indication.

2. A system for registering with a Local Mobility Anchor (LMA), comprising:

a first Local Mobility Anchor (LMA), comprising computing hardware configured to receive a first Proxy Binding Update (PBU) message sent by a Mobile Access Gateway (MAG), and send a Proxy Binding Acknowledge (PBA) message to the MAG in response to the first PBU message, wherein the PBA message contains registration failure information of the first LMA, the registration failure information of the first LMA includes a registration failure cause, the registration failure cause is resource insufficiency or local management policy adjustment; and the PBA message further contains a redirection indication to indicate the MAG to send a subsequent PBU message to a second LMA, and the redirection indication includes an address of the second LMA; and the MAG, comprising computing hardware configured to:
send, on behalf of a Mobile Node (MN), the first PBU message to the first LMA, wherein the first PBU message is a request message for establishing, on the first LMA, a binding between a home network prefix of the MN and a proxy care-of address (Proxy-CoA) of the MAG, receive the PBA message from the first LMA, and in response to the PBA message with the registration failure information of the first LMA, send, on behalf of the MN, a second PBU message to the second LMA according to the address of the second LMA included in the redirection indication.

3. An agent device, comprising:

computing hardware configured to:

send on behalf of a Mobile Node (MN), a first Proxy Binding Update (PBU) message to a first Local Mobility Anchor (LMA), wherein the first PBU message is a request message for establishing, on the first LMA, a binding between a home network prefix of the MN and a proxy care-of address (Proxy-CoA) of the agent device;

receive a Proxy Binding Acknowledge (PBA) message from the first LMA in response to the first PBU message, wherein the PBA message contains registration failure information of the first LMA, the registration failure information of the first LMA includes a registration failure cause, the registration failure cause is resource insufficiency or local management policy adjustment; and the PBA message further contains a redirection indication to indicate the agent device to send a subsequent PBU message to a second LMA, and the redirection indication includes an address of the second LMA; and in response to the PBA message with the registration failure information of the first LMA, send, on behalf of the MN, a second PBU message to the second LMA according to the address of the second LMA included in the redirection indication.

* * * * *